United States Patent
Brunner

(10) Patent No.: US 10,759,525 B2
(45) Date of Patent: Sep. 1, 2020

(54) DRIVE SYSTEM FOR A VEHICLE

(71) Applicant: Dirk Brunner, München (DE)

(72) Inventor: Dirk Brunner, München (DE)

(*) Notice: Subject to any disclaimer, the term of this patent is extended or adjusted under 35 U.S.C. 154(b) by 167 days.

(21) Appl. No.: 15/994,487

(22) Filed: May 31, 2018

(65) Prior Publication Data

US 2018/0346107 A1    Dec. 6, 2018

(30) Foreign Application Priority Data

May 31, 2017 (DE) .................. 10 2017 111 911

(51) Int. Cl.
| | |
|---|---|
| *B64C 27/02* | (2006.01) |
| *B64D 27/24* | (2006.01) |
| *B64C 27/12* | (2006.01) |
| *B60L 50/60* | (2019.01) |
| *B60L 58/21* | (2019.01) |
| *B64C 11/18* | (2006.01) |
| *B60L 7/10* | (2006.01) |
| *B63H 5/07* | (2006.01) |

(Continued)

(52) U.S. Cl.
CPC ............. *B64C 27/025* (2013.01); *B60L 7/10* (2013.01); *B60L 50/66* (2019.02); *B60L 58/21* (2019.02); *B63H 5/07* (2013.01); *B63H 21/17* (2013.01); *B64C 11/18* (2013.01); *B64C 27/024* (2013.01); *B64C 27/028* (2013.01); *B64C 27/12* (2013.01); *B64D 27/24* (2013.01); *H02P 3/14* (2013.01); *B60L 2200/10* (2013.01); *B60L 2200/32* (2013.01); *B64C 2201/042* (2013.01); *H02P 2201/09* (2013.01)

(58) Field of Classification Search
CPC ........ A63H 27/00; A63H 27/02; A63H 27/12; A63H 27/04; B60L 7/10; B63H 5/07
USPC ............................................. 416/19
See application file for complete search history.

(56) References Cited

U.S. PATENT DOCUMENTS 3,129,904 A * 4/1964 Hanson .................. B64C 27/14
                                                                               244/17.19
3,481,559 A * 12/1969 Apostolescu .......... B64C 37/00
                                                                                244/2

(Continued)

FOREIGN PATENT DOCUMENTS

DE     102004032530 A1    10/2005
DE     102014018243 A1    6/2016

(Continued)

*Primary Examiner* — Michael Lebentritt
*Assistant Examiner* — Topaz L. Elliott
(74) *Attorney, Agent, or Firm* — Moser Taboada

(57) ABSTRACT

The invention relates to a drive system for a vehicle, comprising at least one asymmetrical rotor (18), which has at least one rotor blade (20) extending radially from a rotor axle, and a counterweight (22) which is opposite the rotor axle, the system further comprising a control device for the electric motor (24), which connects the electric motor (24) to a battery for the power supply thereof, and is configured and designed, during a revolution cycle, which includes 1-3 revolutions of the rigid rotor blade (20), to bring about at least one acceleration phase, in which the electric motor (24) can be accelerated to accelerate the rotor (18), and at least one braking phase, in which the electric motor (24) can be braked, the control device being designed, during at least part of the braking phase, to connect the electric motor (24) to at least one battery element (28) in generator mode.

17 Claims, 7 Drawing Sheets

(51) Int. Cl.
*B63H 21/17* (2006.01)
*H02P 3/14* (2006.01)

(56) References Cited

U.S. PATENT DOCUMENTS

| | | | | |
|---|---|---|---|---|
| 3,587,511 | A * | 6/1971 | Buddrus | B63H 20/20 |
| | | | | 440/5 |
| 3,630,304 | A * | 12/1971 | Sahinkaya | B60L 7/12 |
| | | | | 180/179 |
| 4,874,291 | A * | 10/1989 | Roberts | B64C 27/08 |
| | | | | 416/122 |
| 4,955,560 | A | 9/1990 | Nishina et al. | |
| 5,110,314 | A | 5/1992 | Fujihara et al. | |
| 6,619,585 | B1 * | 9/2003 | Lidak | B64C 27/00 |
| | | | | 244/17.11 |
| 2010/0125383 | A1 * | 5/2010 | Caouette | B63H 21/17 |
| | | | | 701/21 |
| 2014/0097290 | A1 * | 4/2014 | Leng | B64C 29/0025 |
| | | | | 244/6 |
| 2016/0001877 | A1 * | 1/2016 | Paulos | B64C 39/028 |
| | | | | 701/3 |
| 2017/0160750 | A1 * | 6/2017 | Kimchi | G05D 1/0833 |
| 2017/0310120 | A1 * | 10/2017 | Birkl | H02J 7/0008 |
| 2018/0002005 | A1 * | 1/2018 | Groenewald | B64C 27/32 |
| 2018/0222579 | A1 * | 8/2018 | Simon | B64C 27/30 |
| 2019/0009894 | A1 * | 1/2019 | Cai | B64C 27/32 |

FOREIGN PATENT DOCUMENTS

| | | | | |
|---|---|---|---|---|
| GB | 537478 A * | 6/1941 | | B64C 27/025 |
| WO | WO-2014160526 A2 | 10/2014 | | |

* cited by examiner

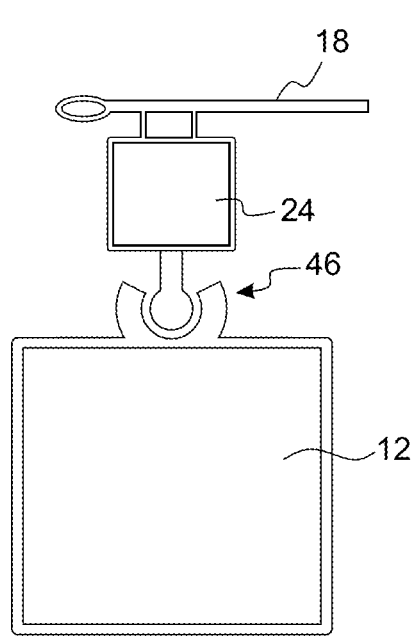
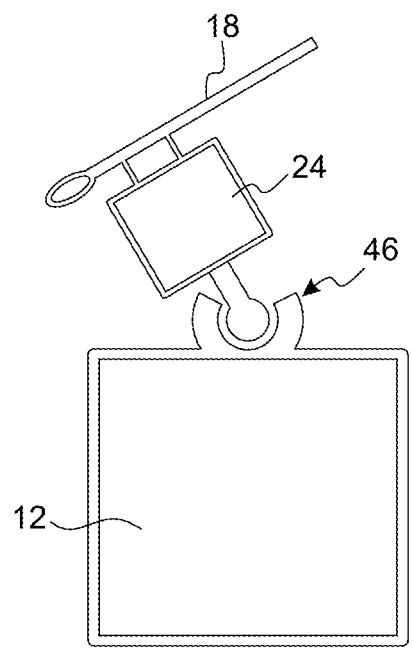
Fig. 11a　　　Fig. 11b
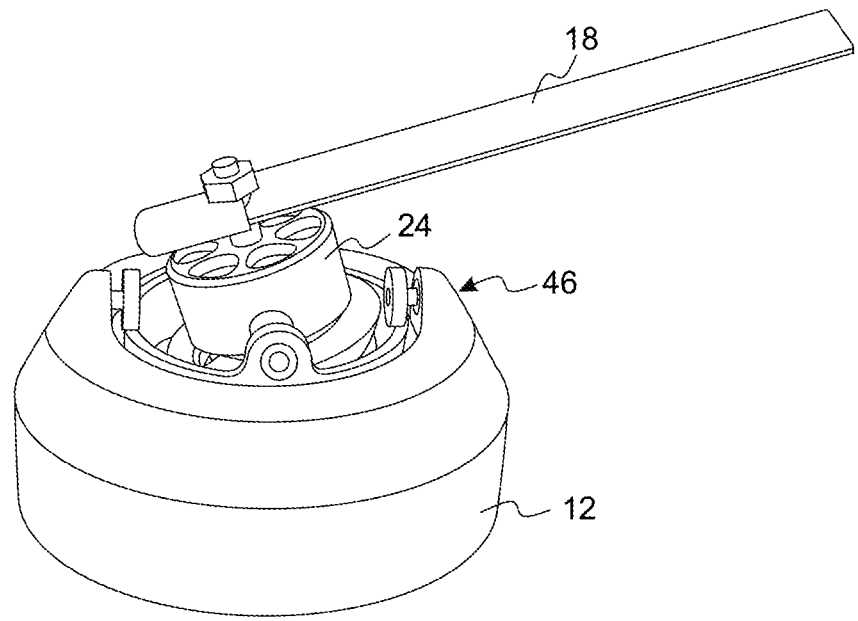
Fig. 12

DRIVE SYSTEM FOR A VEHICLE

CROSS-REFERENCE TO RELATED APPLICATIONS

This application claims priority to and the benefit of German Patent Application No. 10 2017 111 911.6, filed on May 31, 2017, the disclosure of which is incorporated herein by reference in its entirety.

BACKGROUND

The invention relates to a drive system for a vehicle, comprising at least one asymmetrical rotor, which has at least one rotor blade extending radially from a rotor axle and a counterweight which is opposite the rotor axle, the system further comprising a control device for the electric motor, which device connects the electric motor to a battery for the power supply thereof. The invention further relates to an air and watercraft which is equipped with said system.

U.S. Pat. No. 5,110,314A discloses such a device in which the rotor has an acceleration phase, in which the electric motor can be accelerated to accelerate the rotor, and a braking phase, in which the electric motor can be braked, the positive and negative accelerations being used to elastically deform a flexible rotor blade and thereby change the angle of attack and the direction of lift.

SUMMARY

The problem addressed by the invention is that of providing a generic drive system for a vehicle and an air and watercraft equipped with said system, which makes it possible to control the vehicle without additional control means and, at the same time, operates in an energy-efficient manner.

The invention results from the features of claim 1 and claim 5. Advantageous developments and embodiments are the subject of the dependent claims.

By means of the positive and negative acceleration of the rotor blade acting on one side, the invention allows a targeted increase or decrease in the thrust force generated by the rotor blade and thus a change in the overall direction of the force acting during a revolution cycle. A moment can thus be generated by an axle going through the rotational plane of the rotor, and a vehicle equipped with the drive system can be controlled in a targeted manner. In particular when the vehicle is a helicopter or a helicopter drone, said vehicle can be articulated or tilted in directions which are not possible by means of conventional drive systems without pitch adjustment.

In order to utilise the energy obtained during the braking process, a battery element is connected during this phase, the electric motor acting as a generator. If a stronger braking effect is desired, it is also possible to completely short-circuit the electric motor during part of the braking phase or to connect said motor with reversed polarity to the battery serving as the power supply.

According to one advantageous development of the invention, the battery comprises at least two battery elements and a battery-connection device for individually connecting each battery element. As a result, it is possible to design the power supply of the electric motor with maximum flexibility. By adding an additional battery element, it is in particular possible to increase the operating voltage of the electric motor for the acceleration phase. During the braking phase, one or more of the battery elements can be connected, which are thereby charged, after which the electric motor then operates in generator mode.

According to one advantageous development of the invention, the revolution cycle comprises two revolutions. Preferably, the acceleration phase drops into a revolution, and the braking phase into a second, subsequent revolution of the rotor.

According to one advantageous development of the invention, the connection device is configured to connect the battery elements cyclically during the braking phase In this way, a uniform distribution of the energy obtained in the generator mode of the electric motor to the available battery elements, and thus a uniform charge state, is ensured. Preferably, each battery element has a separate means for determining the charge state and, according to one advantageous development, the connection device can also connect, in a targeted manner, battery elements having a lower charge state more often.

According to one advantageous development of the invention, the connection device is configured to connect the battery elements in series in the acceleration phase. In this way, a sufficient operating voltage for the electric motor is ensured.

According to one advantageous development of the invention, the drive system comprises a voltage transformer (booster) increasing the voltage, which transformer can be connected into the circuit in the braking phase and increases the charging voltage of the battery elements. A sufficiently high charging voltage for the battery elements is thus also present during the braking process. It is also possible to connect the voltage transformer into the circuit only in specific states or to design said transformer in such a way that the increased output voltage generated is variable. In particular, the input voltage of the voltage transformer is in the range of from 0.5 V to 5 V, and the output voltage is in the range of from 8 V to 25 V.

The invention further includes an aircraft comprising at least one previously described drive system. Preferably, the aircraft is an autogyro/helicopter or a drone.

According to one advantageous development of the invention, said aircraft comprises a conventional symmetrical multi-blade rotor and a drive system according to the present invention.

According to an alternative development of the invention, the aircraft comprises two drive systems according to the present invention, the rotors of the two drive systems rotating in opposite directions, and the two control devices of which control the respective acceleration phases and braking phases of the two rotors in phase in such a way that the torques are substantially cancelled out.

According to one advantageous development of the invention, at least part of the rotor blade is bent out of the rotational plane away from the centre of gravity of the aircraft at a bend angle of more than 10° in order to generate a radial thrust component in the case of a vertical rotary axle of the rotor. The bend angle is preferably between 20° and 60°.

According to one advantageous development of this design, the rotor blade is fixed to a shaft, and the bend is located at the junction between rotor blade and shaft. This means that the entire rotor blade is inclined with respect to the axis of rotation and generates a radially outwardly directed or inwardly directed thrust component.

More preferably, the bend angle is selected in such a way that the continuation thereof goes through the centre of gravity of the aircraft. In this way, the force component generated by the bend produces the greatest torque.

According to an alternative embodiment, the drive system can also be used to drive a watercraft. A shape of the rotor blade with a bend angle is suitable in this embodiment as well.

According to one advantageous development, the electric motor is fixed to a structural component of the vehicle by means of an articulation. It is thus possible to change the force vector of the rotor blade whilst maintaining the orientation or position of the fuselage. In the case of an autogyro, propulsion can thus be generated without tilting the fuselage. In an aircraft, in the case of curves, the curve radius can be reduced. In a watercraft, a rudder can be made smaller or omitted.

According to one advantageous development of this embodiment, the articulation is in the form of a two-axle universal joint. When the articulation is in the form of a two-axle articulation, an orientation of the propeller axle can be changed by up to 180° (see FIG. 11B—more than 180° does not work).

Further advantages, features and details can be found in the following description in which—optionally with reference to the drawings—at least one embodiment is described in detail. Like, similar and/or functionally like parts are provided with the same reference signs.

BRIEF DESCRIPTION OF THE DRAWINGS

FIGS. 11a, 11b: show two positions of a vehicle comprising a drive system and an articulation;

FIG. 12: is a perspective view of an articulation;

DETAILED DESCRIPTION

Figure 1:
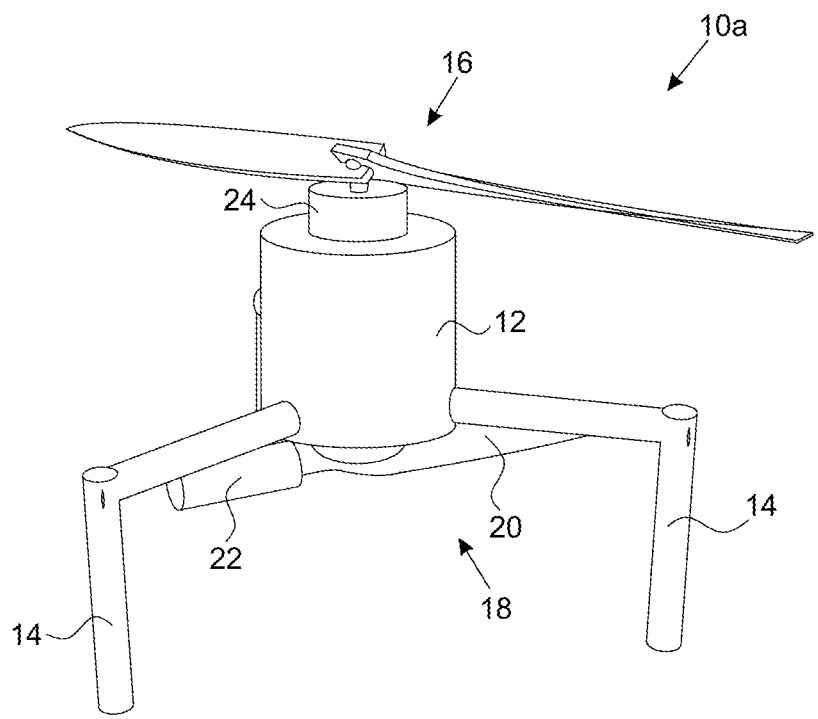
FIG. 1: is a perspective view of a first embodiment of an aircraft.

FIG. 1 is a perspective view of a first embodiment of an aircraft 10a. Said aircraft comprises a cylindrical fuselage 12, to which three supports 14 distributed over the circumference are attached, only two of which are visible. A rotary axle protrudes upwards from the cylindrical fuselage 12, to which axle a conventional, symmetrical rotor 16 having two rotor blades is attached. Below the cylindrical fuselage 12, an asymmetrical rotor 18—also referred to in the following as a vector propeller—is attached, which consists of a rotor blade 20 and a counterweight 22, these two components being adapted to one another in such a way that, during rotation of the asymmetrical rotor 18, the centrifugal forces are balanced out. The two electric motors for driving the two rotors 16, 18 are shown underneath the rotor 16 or above the rotor 18 as cylinders.

Inside the fuselage 12, there are batteries for the electric motors and other control and checking means.

In operation, the symmetrical rotor 16 is used to generate the necessary thrust force to lift the aircraft 10a into the air, and the asymmetrical rotor 18 is used partially for the same purpose, but also to control the aircraft 10a.

Figure 2A:
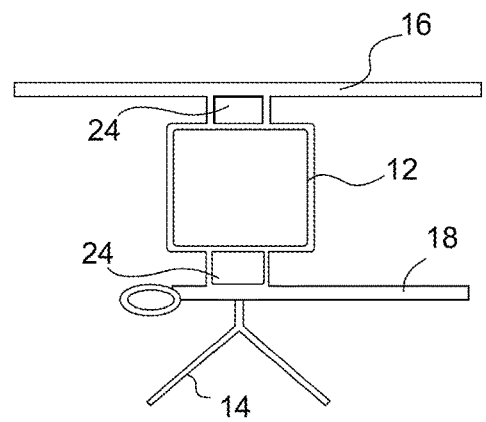
FIGS. 2a, 2b, 2c: is three schematic views of embodiments of different aircraft.
Figure 2B:
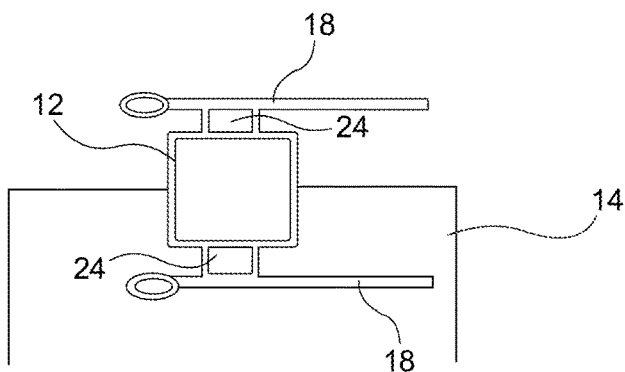
Figure 2C:
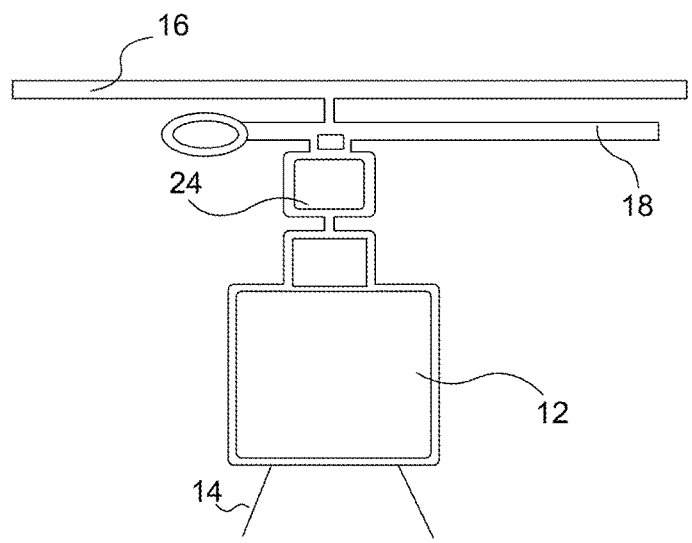

FIGS. 2a, 2b and 2c are three schematic views of embodiments of different aircraft. FIG. 2a shows the embodiment from FIG. 1 having slightly varying supports 14. These supports 14 are guided through a hollow shaft of the lower motor. FIG. 2b shows an embodiment having two asymmetrical rotors 18. The two rotors are driven so as to rotate relative to one another. Advantageously, the rotor revolution of the two rotors is driven in a synchronised manner so that the moments are virtually cancelled out as a result of the opposing directions of rotation of the two rotors. In particular, one rotor can accelerate while the other rotor is braked. As a result, the energy required to accelerate the rotor is utilised in part from the braked rotor.

FIG. 2c shows a third embodiment of an aircraft which substantially corresponds to the embodiment from FIG. 1 or FIG. 2a, that is to say it has a symmetrical and an asymmetrical rotor, with the difference that these two rotors 16, 18 are arranged directly one above the other above the fuselage 12. The upper motor has a hollow shaft.

Figure 3A:
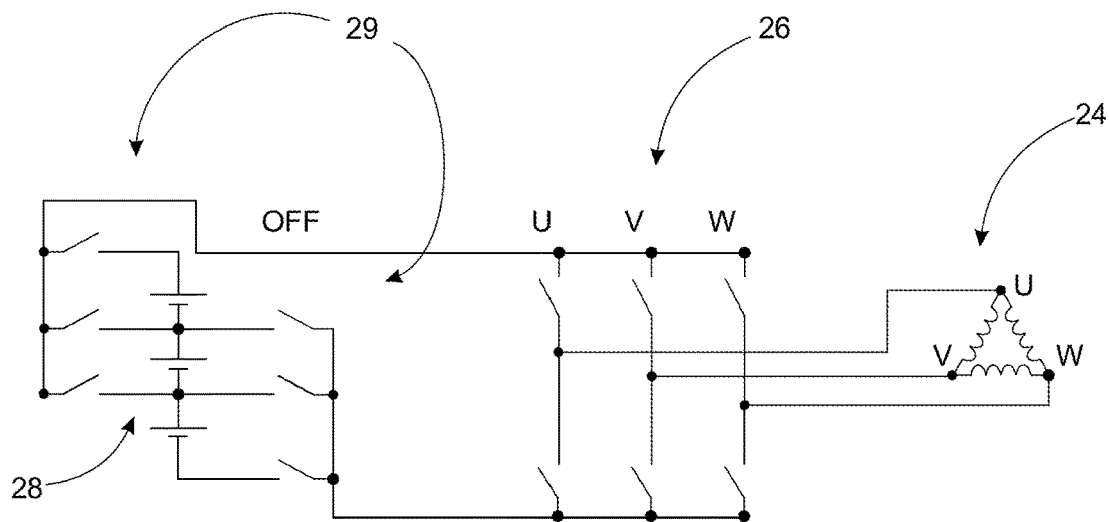
FIGS. 3a, 3b, 3c: shows three different connection states of a connection arrangement.
Figure 3B:
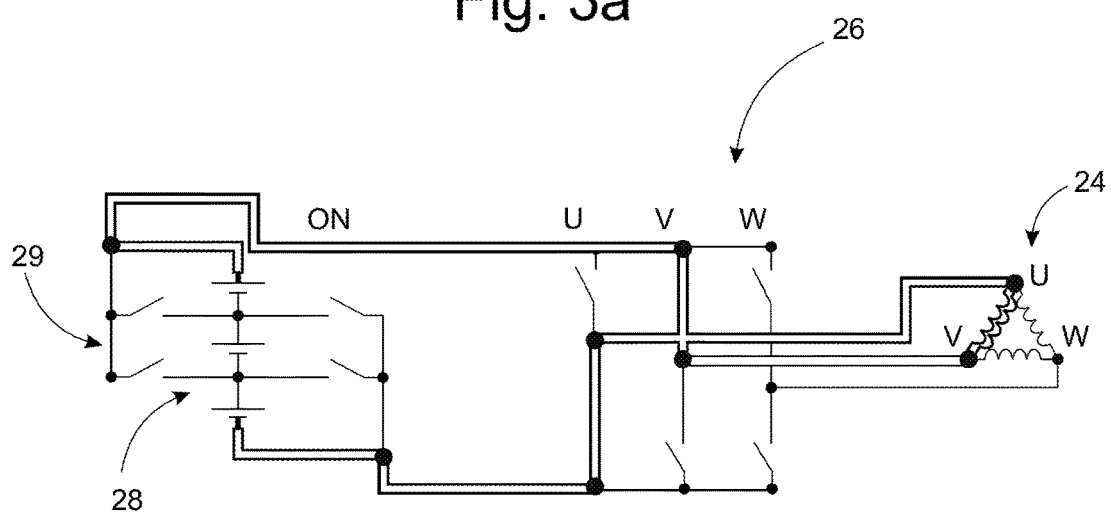
Figure 3C:
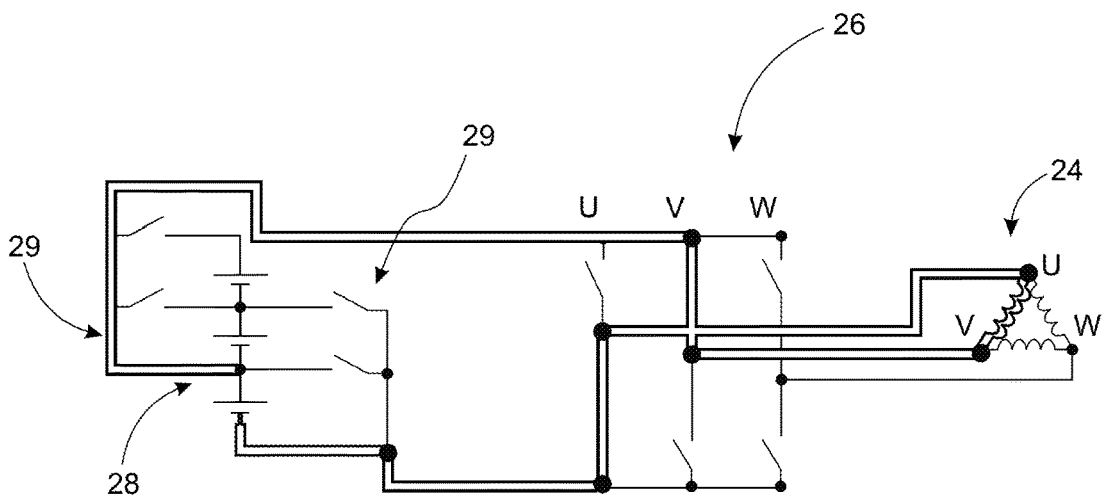

FIGS. 3a, 3b and 3c show three switch positions of a circuit arrangement. With reference to FIG. 3a, a three-phase brushless electric motor 24 comprising three coils is shown, which can be connected via a first connection device 26 to three battery elements 28 connected in series. Furthermore, a second connection device 29 is provided, which can connect each individual battery element 28. By a sensor means (not shown), which detects the phase position of the electric motor 24 and of the rotor 16 or 18 which is rigidly connected thereto, the switches of the connection devices 26 and 29 are switched in normal flight operation in such a way that one of the three coils of the electric motor 24 is always predominantly powered. In the switch position shown in FIG. 3a, the connection device 29 is switched in such a way that none of the battery elements 28 is connected to the electric motor 24, and therefore said motor is not driven. In the position shown in FIG. 3b, the connection device 29 is switched in such a way that all the battery elements 28 are connected to the electric motor 24 and drive said motor. It should be noted that additional well-known connection elements (not shown) can be provided to change the rotational speed of the electric motor 24. FIG. 3c shows an energy recovery position, in which, of the three battery elements 28 shown, the upper two are bypassed, and only the lowermost battery element 28 is connected to the electric motor 24. Since the voltage of said element is too low for the rotational speed of the electric motor 24, said motor automatically operates in generator mode, is braked, and thereby charges up this connected battery element 28.

Figure 4A:
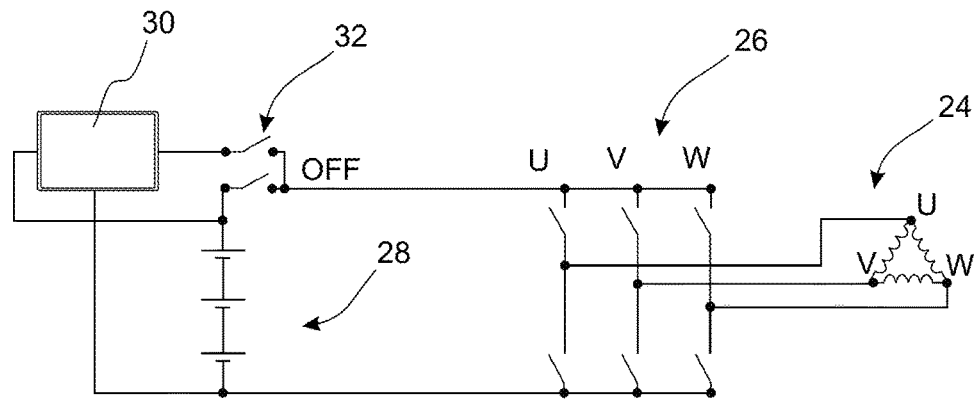
FIGS. 4a, 4b, 4c: shows three different connection states of an additional connection arrangement having a booster.
Figure 4B:
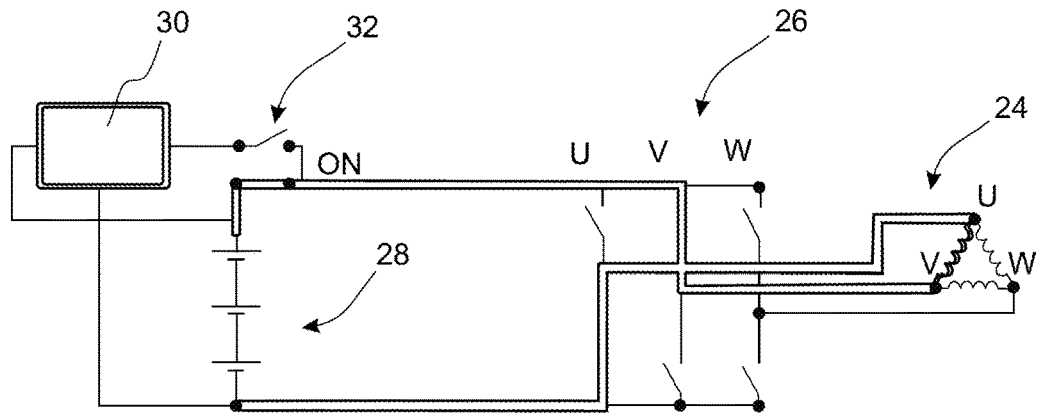
Figure 4C:
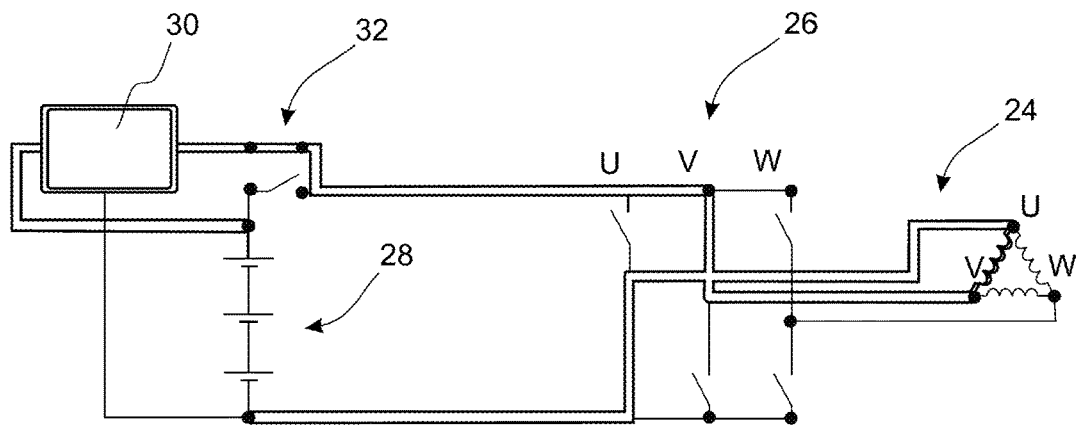

FIGS. 4a, 4b and 4c show an alternative embodiment having a voltage transformer 30 which transforms the input voltage into a higher output voltage. Three switching states between the batteries and the electric motor are shown. The components (except for the missing second connection device 29 and the voltage transformer) are the same as in FIGS. 3a, 3b and 3c, and bear the same reference signs. The voltage transformer or booster 30 which is additionally present in FIGS. 4a, 4b and 4c increases the input voltage to a higher output voltage by means of conventional processes (e.g. chopper, transformer, rectifier). The booster can be connected into the circuit by a double switch 32. The double switch 32 allows three switch positions, namely the two switches open or one of the two closed. A switch position in which the two switches are closed is not permitted. In FIG. 4a, the electric motor 24 is not connected, and therefore the rotor is not rotating/is free-running. In FIG. 4b, the electric motor 24 is in normal drive mode and is powered by the battery elements 28, which is shown by the bold lines. Upon further rotation of the electric motor 24, the connection device 26 is switched accordingly so that the three coils are powered in an alternating manner. FIG. 4c shows the braking phase or energy recovery phase, in which energy is withdrawn from the electric motor 24 and supplied to the battery elements 28. In this case, the double switch 32 is in a switch position such that the voltage applied by the electric motor 24 via the connection device 26 to the right-hand input of the booster 30 is increased to a higher voltage applied to the left-hand output so that the battery elements 28 are charged with a higher charging voltage.

In FIGS. 4a, 4b and 4c, the electric motor 24 is shown equipped with only three coils. In order to achieve the most targeted possible control and acceleration and braking, it is expedient to use a motor having a high number of poles, in particular at least 18 coils and 24 poles or 12 coils and 14 poles. An electric motor 24 of this type for controlling a vector propeller of this type has a higher power than a motor for a constant rotational speed. The stronger an electric motor is, the higher the change in rotational speed can be, in particular when the acceleration and braking phases drop into a revolution. This means a greater control range for the vector propeller.

FIG. 4b shows an operating state in which a coil UV of the electric motor 24 is connected to the battery elements 28 in a normal operating state in such a way that the electric motor 24 is driven. The current flow is shown by thick lines. For this purpose, in each case one of the switches from U and V of the connection device 26 is in the closed position. Furthermore, one of the two switches of the double switch 32, namely the switch which bypasses the voltage transformer 30, is in the open state. When the electric motor 24 driven in this manner continues to move, and one of the two other coils UW and WV enters the effective region, the corresponding switches U, V, W of the connection device 26 are switched accordingly. The switch position of the double switch 32 remains unchanged in this case.

FIG. 4c shows a position in which the booster 30 is connected in series with the normal battery elements 28. As a result, the generator voltage is increased during braking so that all the battery elements 28 connected in series can be charged.

Figure 5:
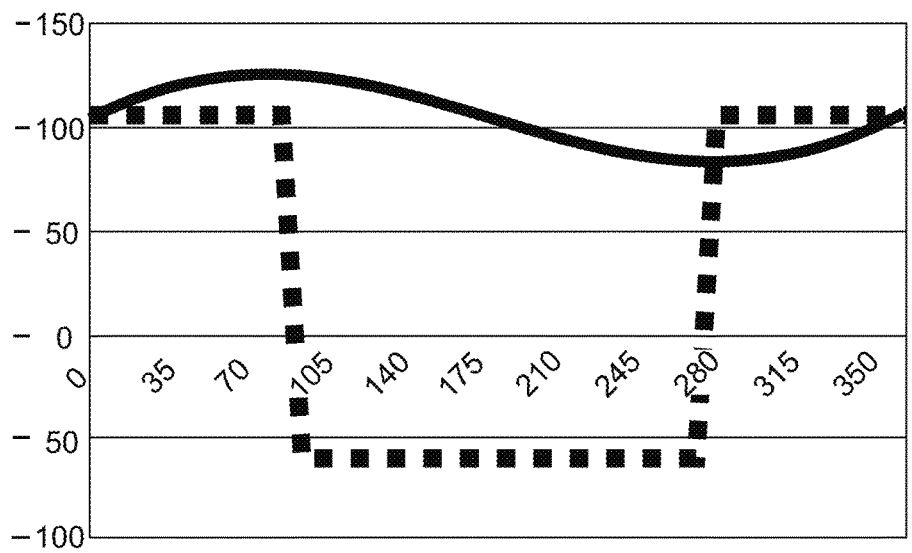
FIG. 5: is two diagrams of the power and speed over the angle of rotation 0-360°.

FIG. 5 shows two diagrams in which a motor or drive power is shown as a dashed line, and a rotor speed resulting therefrom is shown by a solid line over the angle of rotation over a revolution (0°-360°) in degrees. The x-axis shows the angle of rotation in degrees, and the y-axis shows the rotational speed or power. 100 corresponds to 100% of the motor power or rated speed. 360° corresponds to a full revolution. In the example shown, a drive motor is driven with full power up to an angle of rotation of 90°, with the effect that the rotational speed increases from 100% to approximately 115-130%. Subsequently, the electric motor is operated in generator mode up to an angle of rotation of 270°, that is to say with −50% power withdrawn, so that the rotational speed accordingly reduces to a value of from 70-90% of the normal rotational speed. Between 270° and 360°, driving takes place again so that the rotational speed increases in turn. Provided that no specific influence is required on the direction of force, the vector propeller rotates at a constant rotational speed.

From +270° to +90°, the vector propeller is accelerated, and power must be supplied to the electric motor. From +90° to +270°, the vector propeller is braked. The motor acts as a generator and feeds energy back into the batteries. When the rotational speed of the propeller has to be braked to an extreme extent, the electric motor is connected to the battery in opposite polarity. The overall balance of the power cannot be zero per revolution, since power is required for the total thrust.

Figure 6:
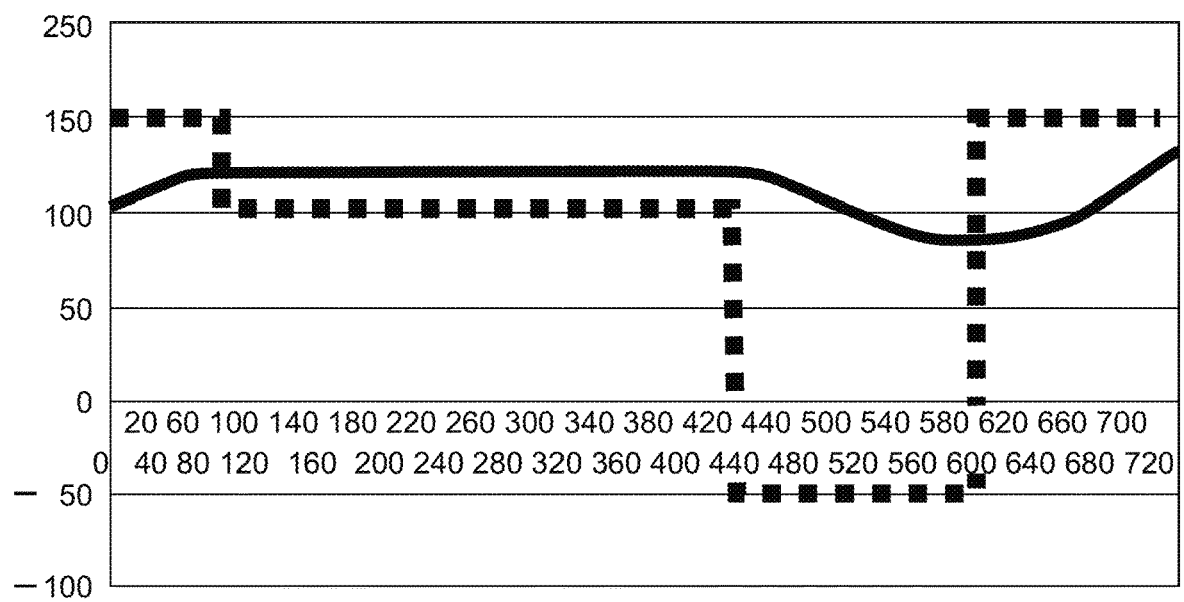
FIG. 6: is two diagrams of the power and speed over the angle of rotation 0-720°.

In the embodiment shown in FIG. 5, the acceleration phase and the braking phase drop into a revolution of the rotor 18. FIG. 6 shows an alternative control in which the acceleration phase and the braking phase drop into two consecutive revolutions so that a pass is achieved after 720°. The x-axis again shows the angle in degrees, and the y-axis shows the rotational speed or power. In this example, the motor is accelerated up to an angle of 90°, then driven with a defined normal power up to 450°, and at 450°, that is to say 90°+360°, braking takes place up to 630° (270°+360°).

Figure 7:
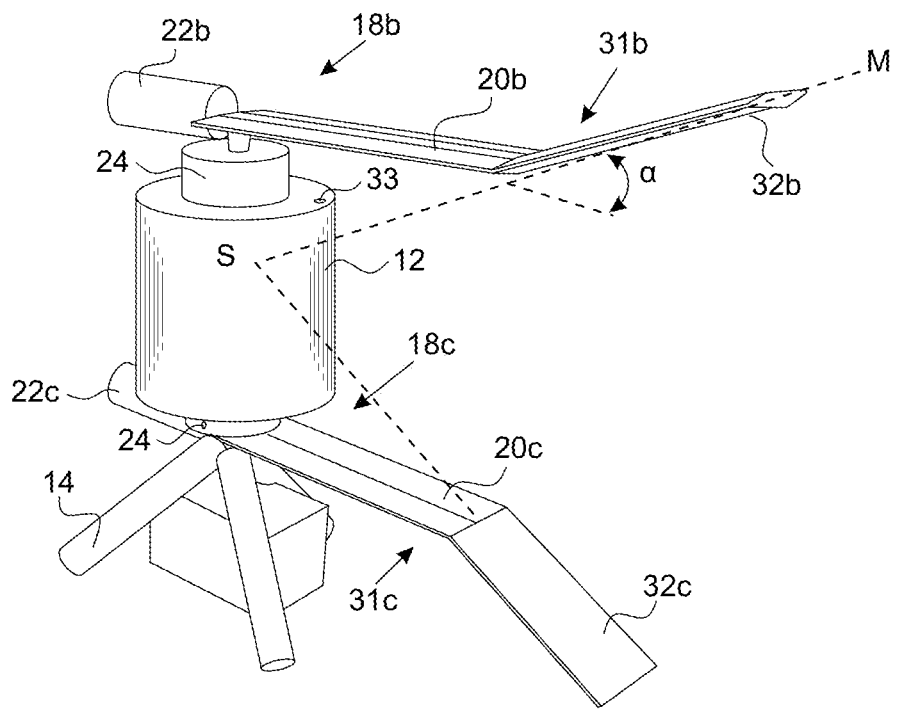
FIG. 7: is a perspective view of a second embodiment of an aircraft.

FIG. 7 is a perspective view of another embodiment of an aircraft 10b which is substantially similar to the view in FIG. 1, but differs therefrom firstly by different supports 14, but essentially in that two asymmetrical rotors 18b, 18c are arranged above and below the fuselage 12, in which the rotor blades 20b, 20c each have a bend 31b, 31c so that the outer rotor blade portions 32b, 32c in each case are oriented at an angle α relative to the rotational plane of the inner portions 21b, 21c of the rotor blades, in such a way that the continuations of the central axes M of the outer rotor blade portions 32b, 32c intersect at the centre of gravity of the aircraft 10b. In this way, these outer rotor blade portions 32b, 32c generate force components perpendicularly to these central axes M. Since the two outer rotor blade portions 32b, 32c are each bent outwards, that is to say, the lower portion is bent downwards, and the upper portion is bent upwards, the radial force components generated as a result counteract one another. In the embodiment now shown, the force generated by the upper, outer rotor blade portion 32b acts radially outwardly, whereas the force generated by the lower, outer rotor blade portion 32c acts radially inwardly. The effect of these two forces is that the rotors generate a higher torque in order to rotate the aircraft about the transverse or longitudinal axis.

The rotors 18b and 18c shown in FIG. 7 each have continuous rotor blades 20b, 20c which extend outwards from the respective centres of rotation. Alternatively, within the scope of the invention, it would also be possible to replace the inner rotor blade portions 21b, 21c in part or in full with supporting rods without a lift function so that lift is generated only in the outer rotor blade portions 32b, 32c.

Figure 8:
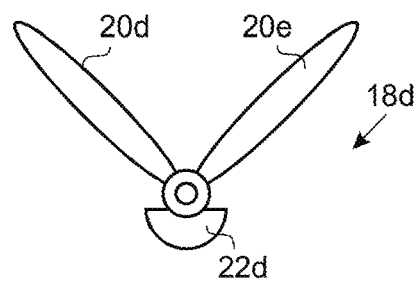
FIG. 8: is a view of an asymmetrical double propeller.

FIG. 8 shows an alternative embodiment of a rotor 18d which comprises two rotor blades 20d and 20e which are at an acute angle to one another. Preferably, said angle is between 30° and 120°. To compensate the centrifugal forces of the two rotor blades 20d and 20e, the rotor 18d also has at least one counterweight 22d. Such a rotor can be used in any of the embodiments of vehicles shown here, in particular the embodiment from FIGS. 1, 2 and 7. This embodiment has the advantage that, by means of the two rotor blades, increased lift can be generated, which corresponds to that of a conventional symmetrical rotor blade, which is provided with the reference sign 16 in FIG. 1.

As a sensor for detecting the position of the rotor 18b in FIG. 7, a simple pressure sensor 33 can be attached, which functions for example as a conventional microphone and detects the passage of the rotor blade 20c by means of the sudden increase in pressure. Alternatively, a plurality of pressure sensors 33 can also be arranged so as to be distributed over the circumference. Pressure sensors 33 of this type can of course also be used in the other embodiments of the aircraft.

Figure 9:
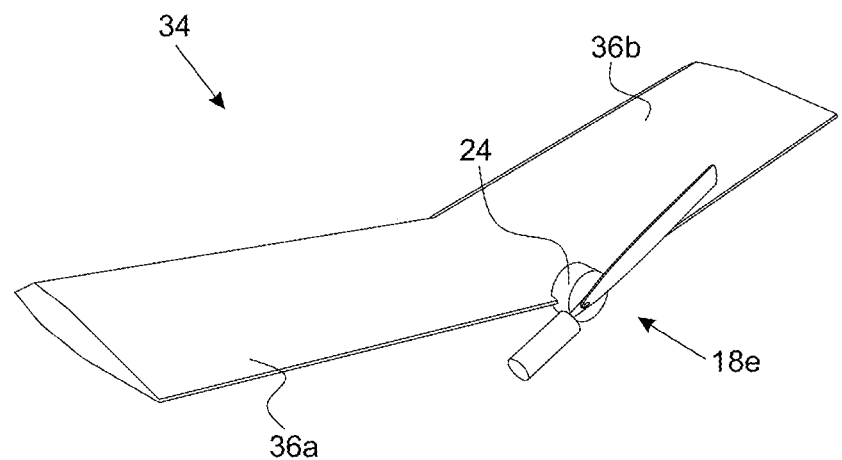
FIG. 9: is a perspective view of a drive for an aircraft.

FIG. 9 is a schematic view of an aircraft 34 which consists substantially of only two aerofoils 36a, 36b (and an interposed fuselage, not shown) and is driven by means of a rotor 18e, which is driven by means of a drive system described above so that, in extreme cases, additional control surfaces are not required, or control surfaces can be made smaller and therefore become lighter. This is particularly advantageous for drones having a simple construction.

Figure 10:
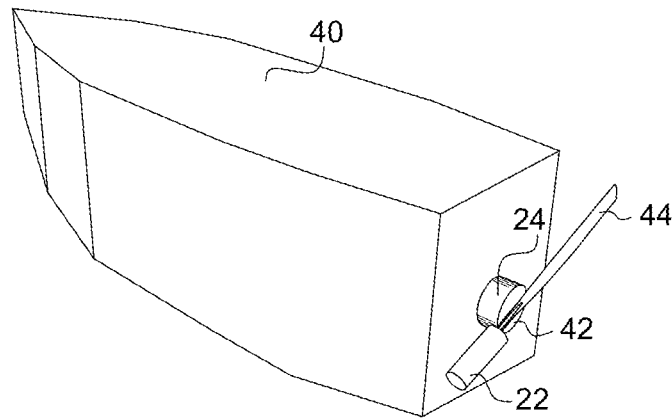
FIG. 10: is a perspective view of a drive for a watercraft.

FIG. 10 is a schematic view of a watercraft 40, which is driven by means of a propeller 42, which is the same shape as the above-described rotors 18. Inside the watercraft 40 are the same components that are accommodated in the fuselage 12 of the above-described aircraft, that is to say in particular batteries, switches and an electric motor. By corresponding acceleration or braking of the individual propeller blades 44 of the propeller 42 so that the points at which the speed is greatest or lowest are on the left-hand or right-hand side of the ship's hull, the watercraft 40 can thus be steered to the right or left.

Although the invention has been illustrated and explained in greater detail by means of preferred embodiments, the invention is not limited by the disclosed examples, and other variations can be derived herefrom by a person skilled in the art without going beyond the scope of protection of the invention. It is therefore clear that there are numerous possible variations. It is also clear that embodiments mentioned by way of example actually only show examples that cannot be interpreted in any way as limiting for example the scope of protection, the possible applications or the configuration of the invention. Instead, the previous description and the description of the drawings allow a person skilled in the art to specifically implement the exemplary embodiments, a person skilled in the art who is familiar with the disclosed inventive concept being able to make various amendments for example with respect to the function or the arrangement of individual elements mentioned in an exemplary embodiment without going beyond the scope of protection, which is defined by the claims and the legal equivalents thereof, such as further clarifications in the description.

FIGS. 11a and 11b show two positions of a vehicle comprising a drive system and an articulation 46 between the drive unit consisting of an electric motor 24 and an asymmetrical rotor blade 18, and the fuselage 12 of an aircraft. The articulation 46 can be in the form of a single-axle or two-axle articulation. When in the form of a single-axle articulation 46, rotation about one axis, in particular a transverse axis, is permitted, in the case of a two-axle articulation 46, such as a ball joint or cardan joint, a tilting movement about two axes of rotation is permitted. In FIG. 11a, the axle of the rotor blade 18 is vertical, such as in the embodiments according to FIGS. 1 and 2, i.e. during rotation without braking and acceleration phases. FIG. 11b shows a state having braking and acceleration phases. By means of the articulation 46, the fuselage 12 can be held, in full or in part, in the original position thereof (FIG. 11a), whereas by means of the tilted rotary axle of the rotor blade 18, a force component is generated in the tilting direction, that is to say in the example in FIG. 11b, in the horizontal direction to the left. The articulation 46 can be movably mounted or can have resilient return means in the form of springs or the like, which generate a certain resetting force toward the home position (FIG. 11a).

FIG. 12 is a perspective view of an articulation 46 which is in the form of a universal joint.

Figure 13:
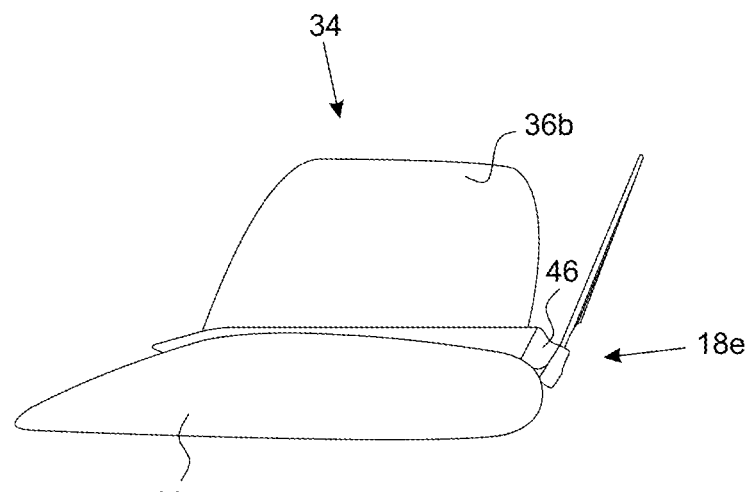
FIG. 13: is a perspective view of an aircraft comprising an articulation.

In FIG. 13, the aircraft shown in FIG. 9 is equipped with an articulation 46 and shown in a perspective view, in the position shown, the rotor axle being inclined obliquely downwards by braking and acceleration phases, as a result of which a downward and forward force is generated. As a result, the turning radius of the aircraft can be decreased or, when in the form of a drone, corresponding movable rudders such as elevators or side rudders can be dispensed with, which leads to a simplified construction. Such an arrangement can of course be used in the same manner in a watercraft according to FIG. 10, as a result of which rudders can be made smaller or omitted.

REFERENCE SIGNS 10a, 10b aircraft
12 fuselage
14 support
16 symmetrical rotor
18, 18a, b, c, d, e asymmetrical rotor, vector propeller
20, 20b, c, d, e rotor blade
21b, 21c inner rotor blade portions
22, 22b, 22c, 22d counterweight
24 electric motor
26 first connection device
28 battery elements
29 second connection device
30 voltage transformer/booster
31b, c bend
32 double switch
32b, c outer rotor blade portions
33 pressure sensor
34 aircraft
36a, b aerofoil
40 watercraft
42 propeller
44 propeller blade
46 articulation
M central axes

The invention claimed is:

1. A drive system for a vehicle, comprising at least one asymmetrical rotor, which has at least one rigid rotor blade extending radially from a rotor axle, and a counterweight which is opposite the at least one rotor blade, the system further comprising a control device for an electric motor, wherein the control device connects the electric motor to at least one battery element for the power supply thereof, and wherein the control device is configured and designed, during a revolution cycle, which includes 1-3 revolutions of the at least one rigid rotor blade, to bring about at least one acceleration phase, in which the electric motor can be accelerated to accelerate the rotor, and at least one braking phase, in which the electric motor can be braked, the control device being designed, during at least part of the braking phase, to connect the electric motor to at least one of the at least one battery element in generator mode.

2. The drive system according to claim 1, wherein the at least one battery element comprises at least two battery elements and a battery-connection device for individually connecting each battery element.

3. The drive system according to claim 2, wherein the connection device is configured to connect the battery elements cyclically.

4. The drive system according to claim 2, wherein the connection device is configured to connect the battery elements in series in the acceleration phase.

5. The drive system according to claim 1, wherein the electric motor and the at least one battery element are part of a circuit, and wherein said system comprises a voltage transformer which increases voltage and can be switched into the circuit in the braking phase and increases a charging voltage of the at least one battery elements.

6. An aircraft, comprising at least one drive system according to claim 1.

7. The aircraft according to claim 6, wherein said aircraft is a helicopter.

8. The aircraft according to claim 6, wherein said aircraft comprises at least a second drive system having a conventional multi-blade rotor that is coaxial to the at least one asymmetrical rotor.

9. The aircraft according to claim 6, wherein said aircraft comprises two drive systems according to claim 1, the two rotors of which rotate in opposite directions, and the two control devices of which control the respective acceleration phases and braking phases of the two rotors in phase in such a way that the torques are substantially cancelled out.

10. The aircraft according to claim 6, wherein said aircraft comprises two drive systems according to claim 1, the two rotors of which rotate in opposite directions, and the two control devices of which control the respective acceleration phases and braking phases of the two rotors in such a way that at least some of the braking energy of one rotor is used to accelerate the other rotor.

11. The aircraft according to claim 6, wherein at least part of the at least one rotor blade is fixedly bent out of the rotational plane away from the centre of gravity of the aircraft at a bend angle of more than 100 in order to generate a radial thrust component.

12. The aircraft according to claim 6, wherein the aircraft comprises two aerofoils and an interposed fuselage and is driven by the at least one rotor blade and drive system according to claim 1.

13. A watercraft, comprising at least one drive system according claim 1.

14. The watercraft according to claim 13, wherein at least part of the at least one rotor blade is bent out of the rotational plane at a bend angle of more than 10 degrees.

15. A vehicle comprising at least one drive system according to claim 1, wherein the electric motor is fixed to a structural component of the vehicle by means of an articulation.

16. The vehicle according to claim 15, wherein the articulation is in the form of a two-axle universal joint.

17. A vehicle comprising two drive systems, wherein each of the two drive system comprises:

an asymmetrical rotor which has at least one rotor blade extending radially from a rotor axle, and a counterweight which is opposite the at least one rotor blade, the system further comprising a control device for an electric motor, wherein the control device connects the electric motor to at least one battery element for the power supply thereof, and wherein the control device is configured and designed, during a revolution cycle, which includes 1-3 revolutions of the at least one rotor blade, to bring about at least one acceleration phase, in which the electric motor can be accelerated to accelerate the rotor, and at least one braking phase, in which the electric motor can be braked, the control device being designed, during at least part of the braking phase, to connect the electric motor to at least one of the at least one battery element in generator mode, wherein the asymmetrical rotors of the two drive systems rotate in opposite directions, and the control devices which control the respective acceleration phases and braking phases of the asymmetrical rotors in such a way that at least some of the braking energy of one rotor is used to accelerate the other rotor.

* * * * *